United States Patent [19]
Brothers

[11] Patent Number: 6,103,844
[45] Date of Patent: Aug. 15, 2000

[54] POLYMERIZATION OF FLUOROMONOMERS IN CARBON DIOXIDE

[75] Inventor: Paul Douglas Brothers, Chadds Ford, Pa.

[73] Assignee: E. I. du Pont de Nemours and Company, Wilmington, Del.

[21] Appl. No.: 09/093,320

[22] Filed: Jun. 8, 1998

[51] Int. Cl.$^7$ ............................... C08F 2/00; C08F 4/02; C08F 14/18

[52] U.S. Cl. ..................... 526/218.1; 526/219.1; 526/247; 526/250; 526/254; 526/255; 526/942

[58] Field of Search ..................... 526/206, 247, 526/255, 249, 942, 250, 254, 218.1, 219.1

[56] References Cited

U.S. PATENT DOCUMENTS

| | | | |
|---|---|---|---|
| 2,435,537 | 2/1948 | Ford et al. | 260/92.5 |
| 3,193,539 | 7/1965 | Hauptschein | 260/87.7 |
| 3,245,971 | 4/1966 | Iserson | 260/92.1 |
| 5,496,901 | 3/1996 | Desimone | 526/89 |
| 5,618,894 | 4/1997 | Desimone et al. | 526/89 |

FOREIGN PATENT DOCUMENTS

| | | | |
|---|---|---|---|
| 0 388 172 | 9/1990 | European Pat. Off. | |
| 0 779 335 | 6/1997 | European Pat. Off. | |
| 45-3390 | 2/1970 | Japan | |
| 46-15511 | 4/1971 | Japan | |
| 6-345824 | 12/1994 | Japan | C08F 214/26 |

OTHER PUBLICATIONS

Kirk–Othmer—Encyclopedia of Chemical Technology, 4$^{th}$ Edition, vol. 11, p. 694 (1994).

Sheppard & Kamath, *The Selection and Use of Free Radical Initiators*, Polymer Engineering and Science 19, 597 (1979).

*Primary Examiner*—Fred Zitomer

[57] ABSTRACT

Polymerization of vinylidene fluoride in carbon dioxide media is effectively initiated by dialkyl(2,2-azobisisobutyrate). Methyl is a preferred alkyl.

14 Claims, No Drawings

POLYMERIZATION OF FLUOROMONOMERS IN CARBON DIOXIDE

FIELD OF THE INVENTION

This invention is in the field of processes for polymerizing fluoromonomers. Fluoromonomers for which the process is suitable include vinylidene fluoride and tetrafluoroethylene.

BACKGROUND OF THE INVENTION

The polymerization of vinylidene fluoride ($VF_2$) in aqueous media is well known. See, for example, Kirk-Othmer, "Encyclopedia of Chemical Technology" 4th ed., vol. 11, page 694 (1994), which mentions persulfate salts and disuccinic acid peroxide among water soluble initiators that can be used and dialkylperoxydicarbonate among monomer soluble initiators that can be used. Polymerization of $VF_2$ was first disclosed by Ford & Hanford in U.S. Pat. No. 2,435,537 using initiators such as benzoyl peroxide and ammonium persulfate. Subsequently, Hauptschein in U.S. Pat. No. 3,193,539 exemplified azo initiators, showing very low yield with azobisisobutyronitrile (AIBN), and Iserson in U.S. Pat. No. 3,245,971 found AIBN to be ineffective.

The polymerization of certain fluorinated monomers in liquid or supercritical carbon dioxide is disclosed, for example, in Japanese Patent Application Publications 45-003390 (1970, Fukui et al.) and 06-345824 (1994, Ezaki et al.), Japanese Patent Publication 46-015511 (1971, Ukihashi et al.), and U.S. Pat. No. 5,496,901 (DeSimone) and U.S. Pat. No. 5,618,894 (DeSimone & Romack). These references disclose various means of initiating polymerization including the use of ionizing radiation and assorted free radical initiators. The '901 patent discloses an extensive list of initiators that can be used including several azo compounds, and states a preference for azobisisobutyronitrile (AIBN).

As shown by tests summarized below, azo compounds commonly used to initiate polymerization are found not to work well, if at all, in attempted polymerizations of $VF_2$ in carbon dioxide. Notably, AIBN yields only a small amount of polymer.

However, azo initiators are desirable because of their predictable kinetics. As discussed by Sheppard & Kamath in Polymer Engineering and Science 19, 597 (1979), azo initiators do not undergo radical induced decomposition, and their decomposition rates are not affected by environment. Thus, it would be desirable to have an effective azo initiator for use in polymerizing VF2 in carbon dioxide.

SUMMARY OF THE INVENTION

This invention provides a process for preparing a fluoropolymer, comprising polymerizing at least one fluorinated monomer in a fluid medium using an azo initiator, wherein said fluid medium comprises carbon dioxide, and said initiator is dialkyl(2,2'-azobisisobutyrate). Dimethyl(2,2'-azobisisobutyrate) is a preferred initiator.

This azo initiator is particularly effective for polymerizing vinylidene fluoride, and provides improved polymerization of tetrafluoroethylene.

DETAILED DESCRIPTION

It has been discovered that dialkyl(2,2-azobisisobutyrate) is effective in initiating polymerization of vinylidene fluoride ($VF_2$) in media comprising carbon dioxide ($CO_2$), producing high molecular weight polymer at high yields. Additionally, this compound is especially effective among azo compounds in initiating polymerization of tetrafluoroethylene (TFE).

The process of the present invention is generally similar to other processes for polymerizing fluorinated monomers in media comprising $CO_2$, except for the choice of specific azo initiator. While the examples below are carried out in batch mode, one skilled in the art will recognize that other modes of polymerization can be used, including semi-batch polymerization in which ingredients are added during polymerization, semi-continuous polymerization in which product is withdrawn intermittently while ingredients are added either continuously or intermittently, and continuous polymerization is which product is withdrawn continuously. Any workable temperature and pressure can be used in the process of the invention. Generally, temperature is in the range of 40°–125° C., preferably 60°–90° C., and pressure is in the range of 900–10,000 psig (6.3–69.1 MPa), preferably 1500–6000 psig (10.4–41.5 MPa).

The initiator used in the process of this invention is dialkyl(2,2-azobisisobutyrate). Preferably, said alkyl groups are independently selected from methyl, ethyl, propyl, n-butyl, isobutyl, secondary butyl, and n-amyl. More preferably, the alkyl groups are the same. Preferred alkyl groups include methyl and ethyl. Methyl is an especially preferred alkyl group. Ethyl is another especially preferred alkyl group. Usually the amount of initiator used will be in the range of 0.001–25 mg/g of polymer produced, more commonly in the range of 0.005–10 mg/g of polymer produced.

The invention is useful for the manufacture of a wide variety of fluoropolymers. "Fluoropolymer" as used in this application is intended to encompass a broad spectrum of thermoplastic and elastomeric polymers of at least one fluorinated monomer. These fluoropolymers may be homopolymers of a fluoromonomer, may be copolymers of two or more fluoromonomers, or may be copolymers of at least one fluoromonomer and at least one fluorine-free monomer. Generally, such fluoropolymers contain at least 35 wt % of fluorine.

"Fluoromonomer" is used in this application to mean a compound containing a vinyl group that may be free-radically polymerized and that contains at least one fluorine atom, fluoroalkyl group, or fluoroalkoxy group attached to the vinyl group that undergoes polymerization. Preferred fluoromonomers are fluoroolefins. While the process of the present invention is particularly valuable for polymerizing $VF_2$ and TFE, useful fluoromonomers include, but are not limited to, vinyl fluoride; trifluoroethylene; chlorotrifluoroethylene (CTFE); 1,2-difluoroethylene; tetrafluoroethylene (TFE); hexafluoropropylene (HFP); perfluoro(alkyl vinyl ethers) such as perfluoro(methyl vinyl ether) (PMVE), perfluoro(ethyl vinyl ether) (PEVE), and perfluoro(propyl vinyl ether) (PPVE); perfluoro(1,3-dioxole); perfluoro(2,2-dimethyl-1,3-dioxole) (PDD); $CF_2=CFOCF_2CF(CF_3)$ $OCF_2CF_2X$ wherein X is $SO_2F$, $CO_2H$, $CH_2OH$, $CH_2OCN$ or $CH_2OPO_3H$; $CF_2=CFOCF_2CF_2SO_2F$; $F(CF_2)_n CH_2OCF=CF_2$ wherein n is 1, 2, 3, 4 or 5; $R^1CH_2OCF=CF_2$ wherein $R^1$ is hydrogen or $F(CF_2)_m$— and m is 1, 2 or 3; and $R^3OCF=CH_2$ wherein $R^3$ is $F(CF_2)_z$— and z is 1, 2, 3 or 4; perfluorobutyl ethylene (PFBE); 3,3,3-trifluoropropene and 2-trifluoromethyl-3,3,3-trifluoro-1-propene. Preferred fluoromonomers are 3,3,3-trifluoropropene, 2-trifluoromethyl-3,3,3-trifluoro-1-propene, PFBE, vinyl fluoride, $VF_2$, HFP, PMVE, PEVE, PPVE, CTFE, and PDD.

The fluoromonomer may be polymerized alone to form a homopolymer if the fluoromonomer can be homopolymerized, or may be polymerized with one or more other fluoromonomers or other monomers that are not fluoromonomers to form a copolymer. If a copolymer is to be formed, the monomers chosen must be able to copolymerize. In copolymers, the other monomers preferably are fluorinated monomers and, more preferably, are fluoroolefins having 2–8 carbon atoms or fluorinated vinyl ethers having 3–8 carbon atoms. Especially preferred comonomers are tetrafluoroethylene, hexafluoropropylene, perfluoro(methyl vinyl ether), perfluoro(ethyl vinyl ether), and perfluoro (propyl vinyl ether). Fluorine-free monomers that copolymerize with some combinations of fluoromonomers include propylene and ethylene. Examples of useful homopolymer fluoropolymers include polyvinylidene fluoride ($PVF_2$) and polytetrafluoroethylene (PTFE). Also usually classed with homopolymer PTFE are the modified PTFE polymers containing fluoromonomers other than TFE in such minor amounts that the modified polymers retain the non-melt-fabricable character of PTFE. Examples of useful copolymers include the copolymers of TFE with HFP and/or perfluorinated vinyl ethers such as PPVE or PEVE, copolymers of TFE with PMVE, copolymers of TFE with PDD, and copolymers of TFE or CTFE with ethylene. Further examples include the copolymers of $VF_2$ with HFP, or with HFP and TFE. As implied above, copolymers may contain additional monomers beyond those named. TFE/ethylene copolymers, for example, are most useful if they include additional monomers that introduce bulky side groups such as PFBE, HFP, PPVE or 2-trifluoromethyl-3,3,3-trifluoro-1-propene, and elastomeric polymers frequently include low concentrations of cure site moieties derived from a cure site monomer and/or a chain transfer agent (CTA).

EXAMPLES

The normal practice in charging gaseous constituents to a shaker tube for polymerization reactions such as described below is to charge the gases in a sequence determined by the source pressures, starting with the low-pressure gas and proceeding to the high-pressure gas. It is common to charge $CO_2$ first, because cylinder pressures for $CO_2$ are usually low. When TFE is used, it is charged as a mixture with $CO_2$, usually 50/50 by weight, and supplemental $CO_2$ is charged separately to arrive at the stated $CO_2$ charge.

Copolymer compositions are determined by $^{19}F$ NMR spectroscopy, which is also used to confirm the structure of polyvinylidene fluoride. Fourier transform infrared spectroscopy (FTIR) is used to confirm the structure of PTFE.

Thermal characteristics of polymers are determined by differential scanning calorimetry (DSC) according to ASTM D-4591. Unless otherwise stated, melting temperature ($T_m$) and heat of fusion ($\Delta H_f$) are derived from the melting endotherm on second heating, with melting temperature being the peak temperature.

Melt flow rate (MFR) of fluoropolymers is determined according to ASTM method D-1238-94a, using a plastometer modified by use of corrosion-resistant alloy as described in ASTM specification D-2116-91a, and using a 5 kg load at temperatures of 232° C. for all VF2 polymers and 372° C. for PTFE. Melt flow is zero in several of the examples to follow, indicating high molecular weight. While this is expected and desirable for PTFE, except for PTFE micropowder, such high molecular weight is incompatible with conventional melt processing of other polymers. One skilled in the art will recognize that molecular weight can be regulated to achieve melt viscosity in commercially desirable ranges for melt-flowable polymers, e.g., from 50 Pa·s to $1 \times 10^5$ Pa·s, preferably from 500 Pa·s to $5 \times 10^4$ Pa·s, by adjusting initiator concentration, by the use of chain transfer agents, and the like.

Comparison A

A 400 mL stainless steel vessel (shaker tube) is thoroughly cleaned and cooled to approximately 0° C. The vessel is flushed with nitrogen to remove all oxygen and 0.09 g of 2,2'-azobis(2,4-dimethylpentanenitrile) (VAZO® 52, DuPont) is quickly added to the vessel. Then the vessel is sealed, evacuated, and cooled to less than −40° C. Through an addition port equipped with a high pressure block valve, 100 g of vinylidine fluoride ($VF_2$) and 225 g of $CO_2$ (99.99% pure with less than 9 ppm of $O_2$, Coleman Grade, M-G Industries) are then added and the block valve is closed. While agitating, the vessel is heated to increase the temperature of the contents to 55° C., at which point the autogenous pressure is about 4100 psig (28.4 MPa). After 10 hr, the vessel is cooled, pressure is released and the vessel is opened. No polymer is produced.

Comparison B

The procedure of Comparison A is essentially repeated, except that 0.06 g of 2,2'-azobis(2-methylpropanenitrile) (VAZO® 64, DuPont, also called azobisisobutyronitrile or AIBN) is used instead of the VAZO® 52, the temperature is 68° C., and the resultant autogenous pressure is about 5100 psig (35.3 MPa). The initiator amount and temperature are set to produce the same number of radicals over a 10 hr period as produced in Comparison A. After 10 hr, the autogenous pressure has dropped to about 5000 psig (34.6 MPa), the vessel is cooled, pressure is released and the vessel is opened. Only 2.6 g of white polymer are recovered. The polymer is confirmed by $^{19}F$ NMR in acetone at room temperature to be polyvinylidene fluoride having 4.3 mol % of head-to-head units, and has $T_m = 169°$ C. and $\Delta H_f = 62$ J/g.

Example 1

The procedure of Comparison A is essentially repeated, except that 0.082 g of dimethyl(2,2'-azobisisobutyrate) (V-601, Wako Pure Chemical Industries, Ltd.) is used instead of the VAZO® 52, the temperature is 69.5° C., and the resultant autogenous pressure is approximately 5000 psig (34.6 MPa). The initiator amount and temperature are set to produce the same number of radicals over a 10 hr period as produced in Comparisons A and B. After 10 hr, the autogenous pressure has dropped to about 4400 psig (30.4 MPa), the vessel is cooled, pressure is released and the vessel is opened. The amount of polymer recovered as a white powder is 22.8 g, showing the effectiveness of dialkyl (2,2-azobisisobutyrate) in contrast to other azo initiators. The polymer is confirmed by $^{19}F$ NMR in DMAC at 100° C. to be polyvinylidene fluoride having 4.6 mol % of head-to-head units. $T_m$ is 169° C., $\Delta H_f$ is 58 J/g, and MFR is 0 g/10 min. The plug removed from the melt flow apparatus is loosely fused and off-white in color.

Comparison C

The procedure of Comparison A is essentially repeated, except that 0.10 g of 2,2'-azobis(N,N'-dimethyleneisobutyramidine)dihydrochloride (VA-044, Wako) is used instead of the VAZO® 52, the amount of $CO_2$ is 275 g, 50 g of TFE are used instead of $VF_2$, the temperature is 55° C., and the run time is 4 hr. The resultant autogenous pressure is about 3250 psig (22.5 MPa) and is nearly constant throughout the run. Only 0.04 g of product is recovered, which thermogravimetric analysis suggests is low-molecular-weight PTFE.

Comparison D

The procedure of Comparison C is essentially repeated except that 0.06 g of AIBN is used instead of the VA-044, the temperature is 68° C., the autogenous pressure is 4600 psig (31.8 MPa), and the run time is 10 hr. At the end of the run, the pressure is 4000 psig (27.7 MPa). The amount of polymer recovered as a white powder is 33.1 g. $T_m$ is 330° C. and $\Delta H_f$ is 72 J/g. FTIR confirms that the polymer is PTFE. MFR is 0 g/10 min.

Example 2

The procedure of Comparison D is essentially repeated except that 0.082 g of V-601 is used instead of AIBN, and the temperature increases to 160° C. due to the exothermic reaction before returning to 68° C. At the end of the run, the pressure is 3000 psig (20.8 MPa). The amount of polymer ($T_m$=331° C. and $\Delta H_f$=71 J/g) recovered as a white powder is 45.2 g (90.4% yield), showing the effectiveness of dialkyl (2,2-azobisisobutyrate) in polymerizing TFE. FTIR confirms that the polymer is PTFE and MFR is 0 g/10 min, indicating high molecular weight. The plug removed from the melt flow apparatus is fused and white in color.

Examples 3–6

The procedure of Example 1 is essentially repeated except that mixtures of $VF_2$ and TFE monomers are used instead of $VF_2$ alone, and the reaction time is 5 hr, except for Example 4 for which the reaction time is 1.5 hr. Monomer charges, yields of partially-crystalline polymers, and melting temperatures ($T_m$) of the product copolymers are shown in Table 1. The results indicate that dialkyl(2,2-azobisisobutyrate) is effective for initiating polymerization of $VF_2$/TFE copolymers. MFR is measured at 232° C. For Examples 5 and 6, the resin plugs in the MFR apparatus are loosely fused, a further indication of very high molecular weight, and are white in color. For Examples 3 and 4, the resin plugs in the MFR apparatus are fused and off-white.

TABLE 1

Conditions and Results for Examples 3–6

|  | 3 | 4 | 5 | 6 |
|---|---|---|---|---|
| Conditions: |  |  |  |  |
| $VF_2$ charge (g) | 23.0 | 50.0 | 64.0 | 80.5 |
| TFE charge (g) | 50.0 | 46.5 | 34.8 | 19.5 |
| Results: |  |  |  |  |
| Yield |  |  |  |  |
| (g) | 53.8 | 34.9 | 59.1 | 35.5 |
| (%) | 73.6 | 36.1 | 59.7 | 35.4 |
| $T_m$ (° C.) | 205 | 173 | 145 | 130 |
| MFR (g/10 min) | 0 | 6 | 0 | 0 |
| $VF_2$ (wt %) | — | 41.0 | — | 78.6 |
| TFE (wt %) | — | 59.0 | — | 21.4 |

Examples 7–10

The procedure of Example 1 is essentially repeated except that mixtures of $VF_2$ and hexafluoropropylene (HFP) monomers are used instead of $VF_2$ alone, and the $CO_2$ charge is varied as shown in Table 2. Monomer charges, test pressures (p), and polymer yields are also shown in Table 2. The results indicate that dialkyl(2,2-azobisisobutyrate) is effective for initiating polymerization of $VF_2$/HFP copolymers.

TABLE 2

Conditions and Results for Examples 7–10

|  | 7 | 8 | 9 | 10 |
|---|---|---|---|---|
| Conditions: |  |  |  |  |
| $CO_2$ charge (g) | 225 | 175 | 175 | 175 |
| $VF_2$ charge (g) | 65 | 117 | 106 | 95 |
| HFP charge (g) | 5 | 78 | 44 | 55 |
| Initial p (MPa) | 35.3 | 41.1 | 29.3 | 24.2 |
| Final p (MPa) | 27.0 | 30.1 | 23.1 | 19.1 |
| Results: |  |  |  |  |
| Yield |  |  |  |  |
| (g) | 39.2 | 47.5 | 35.0 | 18.7 |
| (%) | 55.9 | 24.3 | 23.3 | 12.4 |
| $T_m$ (° C.) | 163 | 118 | 135 | 128 |
| $\Delta H_f$ (J/g) | 54 | 26 | 33 | 31 |
| MFR (g/10 min) | 0 | 0 | 0 | 0.6 |
| $VF_2$ (wt %) | 98.2 | 85.3 | 89.4 | 86.3 |
| HFP (wt %) | 1.8 | 14.7 | 10.6 | 13.7 |

Example 11

The procedure of Example 1 is essentially repeated except that vinyl fluoride is used instead of vinylidene fluoride. At the end of the run, the pressure is 3100 psig (21.5 MPa). The amount of polymer recovered as a white powder is 61.7 g, showing the effectiveness of dialkyl(2,2-azobisisobutyrate) in polymerizing vinyl fluoride. NMR confirms that the product is polyvinyl fluoride having 2.1 mol % of tertiary fluorine (normal branching) and 12.3 mol % of linear head-to-head units. $T_m$ is 186° C. and $\Delta H_f$ is 43 J/g. A relative measure of molecular weight is obtained by capillary rheometry on a mixture of 40 wt % polymer in dimethylacetamide with the rheometer operated at 150° C. Viscosities are measured at shear rates ranging from 23.4 sec$^{-1}$ to 3516 sec$^{-1}$. A logarithmic plot of these data is fit to a linear least squares equation which is then used to calculate the viscosity at 100 sect$^{-1}$. The melt viscosity so obtained is 266 Pa·s.

What is claimed is:

1. A process for preparing a fluoropolymer, comprising polymerizing monopmers consisting essentially of one or more fluoromonomers in a fluid medium using an azo initiator, wherein said fluid medium comprises carbon dioxide, and said initiator comprises dialkyl(2,2'-azobisisobutyrate).

2. The process of claim 1, wherein said one or more fluoromonomers are fluoroolefins.

3. The process of claim 1, wherein said fluoropolymer is a copolymer of fluoroolefin and at least one copolymerizable fluoromonomer.

4. The process of claim 3, wherein said copolymerizable fluoromonomer is selected from the group consisting of fluoroolefins, other than said fluoroolefin, having 2–8 carbon atoms, and fluorinated vinyl ethers having 3–8 carbon atoms.

5. The process of claim 2, wherein said fluoroolefin is vinylidene fluoride or tetrafluoroethylene.

6. The process of claim 4, wherein said copolymerizable fluoromonomer is selected from the group consisting of tetrafluoroethylene, hexafluoropropylene, perfluoro(methbyl vinyl ether), perfluoro(ethyl vinyl ether), and perfluoro(propyl vinyl ether).

7. The process of claim 3, wherein said fluoropolymer is elastomeric.

8. The process of claim 3, wherein said fluoropolymer is thermoplastic.

9. The process of claim 1, wherein said fluoropolymer is a homopolyrmer.

10. The process of claim 1, wherein said carbon dioxide is liquid or supercritical.

11. The process of claim 1, wherein said medium consists essentially of carbon dioxide.

12. The process of claim 1, wherein said alkyls are independently selected from the group consisting of methyl, ethyl, propyl, n-butyl, isobutyl, secondary butyl, and n-amyl.

13. The process of claim 1, wherein each of said alkyls is methyl.

14. The process of claim 9, wherein said homopolymer is polytetrafluoroethylene.

* * * * *